Oct. 23, 1962 H. D. BUSH ET AL 3,060,251
HEAD FOR THERMOELECTRIC DEVICE
Filed Sept. 30, 1960
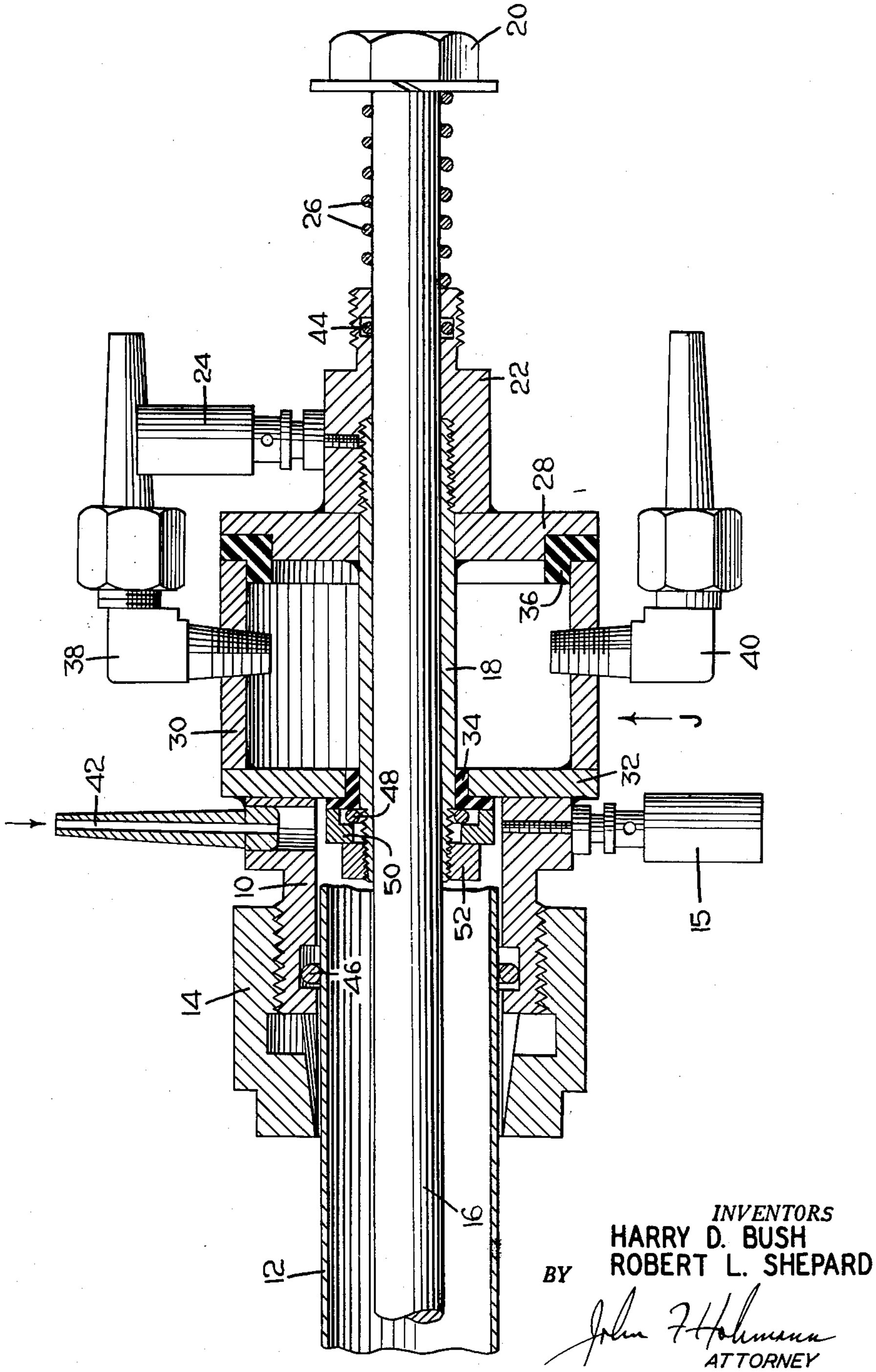
INVENTORS
HARRY D. BUSH
ROBERT L. SHEPARD
BY [signature]
ATTORNEY United States Patent Office 3,060,251

Patented Oct. 23, 1962

3,060,251

HEAD FOR THERMOELECTRIC DEVICE

Harry D. Bush, Cleveland, and Robert L. Shepard, Cleveland Heights, Ohio, assignors to Union Carbide Corporation, a corporation of New York Filed Sept. 30, 1960, Ser. No. 59,574
3 Claims. (Cl. 136—4)

This invention relates to thermoelectric devices. It more particularly refers to a head for such a device.

Recent extensions of commercial and laboratory processes into the temperature range up to between 2000° C. to 3000° C. have accentuated the need for devices which can accurately measure these temperatures on a reproducible basis in such a manner as to be completely objective and adapted to automatic instrumentation control. A thermocouple or a thermopile holds the solution to this instrumentation problem, and one has recently been developed which is capable of measuring these extreme temperatures. This new thermocouple is the subject of patent application Serial No. 506,241, filed May 5, 1955, by R. D. Westbrook and R. L. Shepard, now Patent Number 2,946,835. This thermocouple takes advantage of the semiconductive and extremely refractory properties of graphite and has been particularly designed to operate effectively in this temperature range.

Because of mechanical difficulties encountered when working with graphite, it was convenient to make such a thermocouple with the two dissimilar elements positioned concentric to each other. This concentric arrangement, the extreme temperatures involved and the oxidizability of graphite, presented problems in the production of efficient thermocouples for use in the temperature range 2000° C. to higher than 3000° C.

It is, therefore, the principal object of this invention to provide a head for a concentric thermoelectric device which solves these problems.

In accord with and fulfilling this object, this invention resides in a head for a concentric thermoelectric device, which head comprises a supporting means for the inner element of the thermoelectric device and a clamp for the outer element thereof, the clamp and supporting means being axially aligned but not necessarily concentric themselves. It is important that the clamp and supporting means be electrically conductive and that they be insulated from each other so as not to short circuit the thermoelectric elements. A cooling jacket is provided as part of the head in order to have a convenient cold junction temperature.

This invention is illustrated in the accompanying drawing the single FIGURE of which is a vertical section of a head according to this invention.

Referring now to the drawing, a head for a thermoelectric device according to this invention comprises a clamp 10 adapted to hold the outer tubular element 12 of the thermoelectric device in place by tightening a nut 14. A terminal 15 is mounted on the clamp 10 for electrical contact. The inner element, a rod, 16 passes through a pipe 18 which acts as a supporting means and is fixed in place by a nut 20. The inner element 16 is in contact with a binding post 22 upon which a terminal 24 is mounted. The nut 20 is attached to this binding post 22 through a tension spring 26 designed to take up any slack resulting from thermal expansion or contraction of the thermoelectric device thereby insuring good physical and electrical contact of all the appropriate elements. Since it is necessary to maintain one junction of each thermoelectric element at some single reference temperature a cooling jacket J is provided in the head according to this invention in order to keep the junctions of the elements with the contacts in the head at a constant reference temperature. This jacket J has a back plate 28, walls 30 and a front plate 32. The supporting pipe 18 passes through the jacket J, it being joined to the back plate 28 but insulated from the front plate 32 by means of a non-conductive gasket 34. The walls 30 are suitably joined to the front plate 32 but insulated from the back plate 28 as by a non-conductive gasket 36. Alternatively, the walls 30 may be joined to the back plate 28 and insulated from the front plate 32. The purpose of these two non-conducitve gaskets 34 and 36 is to isolate and segregate the electrical connection to the inner and outer elements 12 and 16 respectively so as not to short circuit the device. Suitable inlet and outlet tubes 38 and 40 respectively are provided through the walls 30 of the cooling jacket J to facilitate passage of a cooling fluid therethrough.

Under some conditions of use of a thermoelectric device, for which the head of the invention is suited, it is necessary or desirable to protect the elements of the device against oxidation. Therefore, provision is made for introducing an inert atmosphere such as helium, nitrogen or argon into the space between the elements 12 and 16. This may be accomplished through an inlet tube 42. The gas introduced may be allowed to leak out of the device, or an outlet (not shown) may be provided for the gas.

A gas-tight relationship is maintained in the head of this invention by means of seal rings 44 and 46, each in contact with the outer element 12 and the inner element 16 respectively. Cooling fluid is contained in the cooling jacket J by means of a sealing ring 48 and a washer 50 which are held in place by a pipe nut 52.

The head of this invention is suitably made of metal parts with the exception of the gaskets, seals and washers which should be compressible and insulating. These parts are more practically made out of non-metals and particularly synthetics such as fluorinated polyolefins or synthetic rubber.

It should be understood that while this invention has been particularly described with reference to thermocouples, its use is not limited thereto. Other thermoelectric elements such as heater, refrigerators or generators may take advantage of the subject of this invention as well. It also can be used for any other substantially constant temperature coaxial, concentric joint desired.

What is claimed is:

1. A head for a thermoelectric device of the type having an inner rod element and an outer tubular element concentrically arranged, which device comprises an electrically conductive clamp for the outer element of said thermoelectric device; an electrically conductive supporting means for the inner element of said thermoelectric device coaxial with said outer clamp and insulated therefrom; and a single cooling jacket axially aligned between said clamp and supporting means, said jacket being in direct physical, cooling contact with both of said thermoelectric elements but being electrically insulated to prevent short circuits between said clamp, supporting means, and said elements.

2. A head as described in claim 1 wherein a gas inlet is provided between said cooling jacket and said clamp adapted to provide a non-oxidizing atmosphere between said inner and the outer elements.

3. A head as described in claim 1 wherein said supporting means comprises a tension spring adapted to take up any slack resulting from thermal expansion or contraction of said thermoelectric device.

References Cited in the file of this patent

UNITED STATES PATENTS

| | | |
|---|---|---|
| 1,849,832 | Herzog et al. | Mar. 15, 1932 |
| 2,815,663 | Lupfer | Dec. 10, 1957 |
| 2,946,835 | Westbrook et al. | July 26, 1960 |

FOREIGN PATENTS

| | | |
|---|---|---|
| 191,712 | Great Britain | July 5, 1923 |